(12) United States Patent
Puente et al.

(10) Patent No.: US 9,033,560 B2
(45) Date of Patent: May 19, 2015

(54) OPAQUE AND MOVABLE ELEMENT PREVENTING SOLAR RAYS FROM FOCUSING IN A HEADLAMP

(71) Applicant: Valeo Vision, Bobigny Cedex (FR)

(72) Inventors: Jean-Claude Puente, Livry Gargan (FR); Pierre Albou, Paris (FR); Benoit Reiss, Margency (FR)

(73) Assignee: Valeo Vision, Bobigny (FR)

( * ) Notice: Subject to any disclaimer, the term of this patent is extended or adjusted under 35 U.S.C. 154(b) by 183 days.

(21) Appl. No.: 13/683,327

(22) Filed: Nov. 21, 2012

(65) Prior Publication Data

US 2013/0141928 A1 Jun. 6, 2013

(30) Foreign Application Priority Data

Nov. 24, 2011 (FR) ...................................... 11 60752

(51) Int. Cl.
*B60Q 1/18* (2006.01)
*F21V 15/00* (2006.01)
*B60Q 1/00* (2006.01)
*F21S 8/10* (2006.01)

(52) U.S. Cl.
CPC .............. *F21V 15/00* (2013.01); *B60Q 1/0005* (2013.01); *B60Q 1/0041* (2013.01); *F21S 48/1768* (2013.01); *B60Q 2400/30* (2013.01); *B60Q 1/0047* (2013.01); *F21S 48/14* (2013.01); *F21S 48/1784* (2013.01); *F21S 48/2225* (2013.01); *F21S 48/23* (2013.01); *F21S 48/232* (2013.01); *F21S 48/24* (2013.01); *F21S 48/31* (2013.01)

(58) Field of Classification Search
CPC .... B60Q 1/0005; F21S 48/1768; F21S 48/14; F21S 48/145; F21S 48/1388; F21S 48/1784
USPC .......................... 362/512, 513, 539, 507, 464
See application file for complete search history.

(56) References Cited

U.S. PATENT DOCUMENTS

| | | | |
|---|---|---|---|
| 6,280,067 B1 * | 8/2001 | Albou | 362/459 |
| 7,201,504 B2 | 4/2007 | Collot et al. | |
| 8,297,814 B2 * | 10/2012 | Tanaka et al. | 362/539 |
| 8,690,401 B2 * | 4/2014 | Bakacha et al. | 362/464 |
| 2006/0164851 A1 | 7/2006 | Collot et al. | |
| 2011/0305029 A1 * | 12/2011 | Chuang et al. | 362/464 |
| 2013/0107559 A1 * | 5/2013 | Gava | 362/516 |

FOREIGN PATENT DOCUMENTS

| | | |
|---|---|---|
| DE | 10347951 | 5/2005 |
| DE | 102005023817 | 11/2006 |
| EP | 1684004 | 7/2006 |
| EP | 1821032 | 8/2007 |
| EP | 2273186 | 1/2011 |

(Continued)

*Primary Examiner* — Peggy Neils
(74) *Attorney, Agent, or Firm* — Jacox, Meckstroth & Jenkins

(57) ABSTRACT

A lighting and/or signaling device and method comprising an opaque element that can move between at least two positions, one of the positions interposing the opaque element between the main light source and the optical focusing device, in which the opaque element is arranged so that when it is interposed between the main light source and the optical focusing device it prevents rays originating from outside the lighting and/or signaling device from being focused, especially in a line or spot, by the optical focusing device, in order to prevent degradation of the lighting and/or signaling device.

24 Claims, 3 Drawing Sheets

(56) References Cited

FOREIGN PATENT DOCUMENTS

| GB | 1298947 | 12/1972 |
| JP | 63151332 | 10/1988 |
| JP | 2010282794 | 12/2010 |
| JP | 2011124110 | 6/2011 |

* cited by examiner

OPAQUE AND MOVABLE ELEMENT PREVENTING SOLAR RAYS FROM FOCUSING IN A HEADLAMP

CROSS-REFERENCE TO RELATED APPLICATIONS

This application claims priority to French Application No. 1160752 filed Nov. 24, 2011, which application is incorporated herein by reference and made a part hereof.

BACKGROUND OF THE INVENTION

1. Field of the Invention

The technical field of the present invention is that of lighting and/or signaling devices for automotive vehicles, and more particularly that of optical modules comprising at least one light source and equipped with an optical focusing device.

2. Description of the Related Art

A headlamp fitted to an automotive vehicle conventionally consists of a housing closed by a window thus defining an internal volume in which components are placed, which components act to generate a light beam intended to be projected onto the path traveled by the vehicle.

These components, in particular, include a light source, a cover, the function of which is to hide the mechanical and electrical parts of components that it is desired to conceal from external observation, or an element for generating a cutoff, in the case where the headlamp has a low-beam function.

For a headlamp equipped with a focusing device, the aforementioned components have been observed to degrade. Specifically, the focusing device, the primary function of which is to concentrate the light emitted by the light source with a view to generating a light beam when the headlamp is turned on, also has a tendency to focus solar rays that enter into the lighting and/or signaling device.

Depending on the position of the sun in the sky, there are situations where the focusing device concentrates the solar rays on one or other of the components installed inside the lighting and/or signaling device. More precisely, concentration of solar rays on the light source increases its temperature until the maximum allowable limit of the light source is exceeded. This is also the case as regards the electronic components that are placed near the light source. Such a situation generates a fire risk in the vehicle.

The situation is even more critical for the cutoff generating element because the latter must meet extremely precise tolerances in order to respect standards relating to the definition of a cutoff. It is thus out of the question to use plastics in the presence of a focusing device that concentrates solar rays, because of the risk of burning the cutoff generating element. Thus a metal is used to manufacture this cutoff generating element which, apart from problems of compatibility between the optical module, which is generally made of plastic, and the metal cutoff generating element, has the aforementioned drawbacks.

SUMMARY OF THE INVENTION

The aim of the present invention is therefore to solve the drawbacks described above mainly by blocking the path of solar rays in order to prevent any concentration of these rays inside the lighting and/or signaling device.

The invention therefore relates to a lighting and/or signaling device comprising at least one main light source and an optical focusing device able to receive light generated by the main light source with a view to forming a main light beam, noteworthy in that it comprises an opaque element that can move between at least two positions, one of the positions interposing the opaque element between the main light source and the optical focusing device, in which the opaque element is arranged so that when it is interposed between the main light source and the optical focusing device it prevents rays originating from outside the lighting and/or signaling device from being focused, especially in a line or spot, by the optical focusing device, in order to prevent degradation of the lighting and/or signaling device.

The element is opaque provided that it prevents the passage of the light rays that reach it, for example by reflecting or absorbing them. Such opacification is for example achieved by depositing a nontranslucent paint on the opaque element or by making the opaque element out of an opaque material.

The very first advantage of the invention is that plastics, which are less expensive, can be used to produce components such as the cutoff generating element. This is because the invention prevents any concentration of solar rays on these components.

Likewise, the main light source is protected from solar rays and thus any degradation of the latter is prevented.

Another advantage is that the external appearance of the lighting and/or signaling device can be improved. Specifically, the opaque element may have a decorative function, for example if the first face of the opaque element is covered with a treatment, especially with a coat of paint, that matches the color of the body of the vehicle intended to be fitted with the lighting and/or signaling device.

The device according to the invention comprises an optical module able to generate a light beam, especially a light beam forming at least part of the main light beam, the module comprising components which include at least the main light source and the optical focusing device, the opaque element being arranged so that when it is interposed between the main light source and the optical focusing device it prevents rays originating from outside the lighting and/or signaling device from being focused by the optical focusing device on at least one of the components of the optical module, in order to prevent degradation of the component of the optical module.

The component the degradation of which it is desired to avoid is, for example, the main light source, but it may also be a member for dipping the main beam, especially taking the form of a deflector.

The expression "member for dipping" is understood to mean a member able to block or deflect light rays originating from the main light source so as to form a cutoff in the main light beam.

For example, the optical module may comprise at least one member for dipping the main beam.

The at least one component of the optical module is the main light source and/or the member for dipping the main beam.

The device according to the invention comprises means for emitting an additional light beam toward the optical focusing device, these means comprising the opaque element. The light rays of the additional light beam propagate from the opaque element toward the optical focusing device. The opaque element is thus an element that takes part in the generation of the additional light beam. It may also be the means generating the additional light beam.

This is another advantage of the invention, which lies in the fact that, apart from the screening function provided by the opaque element, the latter provides an additional lighting function, for example a daytime running lamp.

The optical focusing device is arranged to provide, using the additional light beam, a desired illumination function, especially a daytime running lamp. The expression "desired illumination function" is understood to mean a regulated illumination function specific to automotive vehicles. It may also be a side marker lamp.

The opaque element comprises a first face turned toward the optical focusing device, the first face being reflective. This layout makes it possible to reflect solar rays out of the lighting and/or signaling device. This feature of the invention is also used to reflect the additional light beam, especially generated by an additional light source that is separate from the main light source, toward the focusing element so as to provide a desired illumination function. Thus a daytime running lamp (DRL) may easily be provided, giving the opaque element an additional function.

The first reflective face is arranged to reflect at least 20% of the rays originating from outside of the lighting and/or signaling device, or of the additional light beam.

The reflection coefficient indicated above corresponds to that required to ensure that the component, especially the deflector, does not degrade. In the case where the additional light beam is reflected, such a coefficient may reach 60% by chroming the opaque element, or even 70% by making the opaque element out of aluminum-coated plastic. A coefficient of 50% may also be chosen in the case of aluminized paint.

The opaque and movable element may also absorb rays originating from outside of the lighting and/or signaling device. Thus it is absorbent.

In practice, a painted or bulk-tinted part or a part made of a material known for its opaqueness allows up to 90% of the rays to be absorbed.

The opaque element, for example a stop or screen, is movable in that it may be moved inside the lighting and/or signaling device.

According to a first feature of the invention, the opaque element is interposed between the main light source and the optical focusing device in order to prevent rays originating from outside the lighting and/or signaling device from converging on a point of convergence or focal point, in order to prevent degradation, for example, of the main light source.

According to one feature of the invention, the opaque element comprises a first face turned toward the optical focusing device, the first face being reflective.

The device comprises an additional light source separate from the opaque element, which source generates all or part of the additional light beam. The term "separate" is understood to mean physically distinct, the opaque element being able to move whereas the additional light source is fixed. The additional light source is then installed in the lighting and/or signaling device between the optical focusing device and the opaque element when the latter is interposed between the main light source and the optical focusing device. The additional light beam that it generates is then emitted toward the opaque element, thereby providing more latitude for positioning this additional light source in the lighting and/or signaling device.

The opaque element comprises a transparent or translucent body, the body comprising a first face turned toward the optical focusing device, the first face being transparent or translucent, and a second face turned toward the main light source, the second face being opaque, the body being arranged so as to transmit an additional light beam. The term "transmit" is understood to mean that the light rays are scattered in the body forming the opaque element, the latter thus acting as a light guide.

Such an arrangement allows an additional light source to be installed in the extension of the path traveled by the opaque element during its movement.

The opaque element comprises an additional light source capable of generating the additional light beam and arranged so that the additional light beam propagates in the transparent or translucent body.

According to one embodiment, the additional light beam is generated by an additional light source that is securely fastened to the opaque element. The body of the opaque element thus acts as a light guide and a holder mechanically supporting the additional light source. The opaque element and the additional light source thus form a unitary subassembly.

As regards the aforementioned additional light beam, it will be noted that the latter may alone provide the desired illumination function, especially the DRL function. The invention also relates to the case where an adjacent and independent module is used in combination with the additional light beam to produce the illumination function in question.

According to yet another feature of the invention, the first face is smooth.

Alternatively, the first face comprises a plurality of distortions. These distortions thus reflect the solar rays or the rays of the additional beam that strike the opaque element, so as to scatter the rays in a plurality of directions.

These distortions are prisms for example, especially prisms with planar facets.

According to another embodiment, the opaque element comprises an additional light source, the additional light source being an area light source the light-emitting area of which is turned toward the optical focusing device.

Advantageously, the emission area of the area light source is larger than 1 $cm^2$, even larger than 5 $cm^2$, and even larger than 10 $cm^2$.

Preferably, relative to light-emitting diodes with a Lambertian emission profile, the area light source has a highly directional emission that is directed perpendicular to the emitting surface of the source.

If desired, the area light source has a luminance of at least 5000 $Cd/m^2$.

For example, the area light source is an organic light-emitting diode.

According to another embodiment, the movement of the opaque element is achieved by moving the opaque element in rotation.

The rotation axis is substantially vertical or substantially horizontal and especially lies perpendicular to an optical axis of the lighting and/or signaling device defined by the direction taken by the main light beam generated by the main light source.

Alternatively, the movement of the opaque element is achieved by moving the opaque element in translation.

According to these two embodiments, the opaque element is a shutter able to adopt a first position interposing the opaque element between the main light source and the optical focusing device under the action of a return means, and a second position where it permits the passage of light originating from the main light source, especially through the optical focusing device, via activation of an actuator. The first position is located between the main light source and the optical focusing device and in the extension of the main light source and the focusing device. The second position is equivalent to a retraction of the shutter in order to place it beyond the volume separating the main light source from the optical focusing device.

According to one preferred embodiment, the opaque element is interposed between the main light source and the optical focusing device when the main light source is turned off, especially when neither the actuator nor the main light source are being supplied with power, for example when the electrical power supply of the vehicle is interrupted.

This feature has the advantage of preventing light rays originating from outside the lighting and/or signaling device from being focused into the device whatever the state of the vehicle, for example when the vehicle is parked during the daytime. It is thus possible to make the vehicle safer and reduce electricity consumption.

Advantageously, the main light source is at least one light-emitting diode. Advantageously, the main light source also comprises a device for controlling the one or more light-emitting diodes.

Also advantageously, the optical focusing device is a lens.

Finally, the device according to the invention comprises a housing closed by a transparent wall and defining an internal volume in which at least the main light source, the optical focusing device, and the removable opaque element, are placed.

An optical module is located in the internal volume, this module consisting of a main light source arranged inside a reflector. Such a reflector is for example concave, especially being an ellipsoidal reflector that is open toward the front, i.e. in the direction of the transparent wall.

According to a variant, the focusing device is a biconvex lens.

One of the components is a dipping member, especially formed by a mask or a deflector. This dipping member may for example move in translation but preferably it moves in rotation.

The invention also relates to a method for operating a lighting and/or signaling device for an automotive vehicle comprising at least one main light source and an optical focusing device able to receive light generated by the main light source with a view to forming a main light beam, the lighting and/or signaling device comprising an opaque and movable element, in which the opaque element is interposed between the main light source and the optical focusing device so as to prevent rays originating from outside the lighting and/or signaling device from being focused, especially in a line or spot, by the optical focusing device, in order to prevent degradation of the lighting and/or signaling device.

In this method, the lighting and/or signaling device comprising an optical module able to generate a light beam, especially a light beam forming at least part of the main light beam, the module comprising components which include at least the main light source and the optical focusing device, and the opaque element is interposed between the main light source and the optical focusing device to prevent the optical focusing device from focusing rays originating from outside the lighting and/or signaling device on at least one of the components of the optical module, in order to prevent degradation of the component of the optical module.

In this method, the optical module may comprise at least one member for dipping the main beam.

For example, the at least one component of the optical module is the main light source and/or the member for dipping the main beam.

In this method, the opaque element is interposed between the main light source and the optical focusing device when the main light source is turned off.

The opaque element is interposed between the main light source and the optical focusing device when the electrical power supply of the vehicle is interrupted.

When the lighting and/or signaling device comprises an additional light source, the method makes provision for the additional light source to turn on when the opaque element is interposed between the main light source and the optical focusing device, i.e. when it is placed in its first position.

Of course, the invention includes a method implementing a lighting and/or signaling device such as described above.

Furthermore, the opaque element prevents the main light source from being seen from outside the headlamp, the appearance of the main light source being unpleasant when it is turned off, especially in the case of a white light-emitting diode that uses conversion phosphors.

Other features, details and advantages of the invention will become more clearly apparent on reading the following description that is given by way of indication and with regard to the drawings, in which:

BRIEF DESCRIPTION OF THE
ACCOMPANYING DRAWINGS

FIG. 2 is a partial schematic view that is similar to that in FIG. 1 but in which the main light source is turned on;

FIG. 4 is a partial cross-sectional view of the first variant with the main light source turned on;

FIG. 6 is a partial cross-sectional view of the second variant with the main light source turned on.

It will be noted that the figures show the invention in detail in order to allow the invention to be implemented, the figures may of course be used to better understand the invention if required.

DETAILED DESCRIPTION OF THE PREFERRED
EMBODIMENTS

Figure 1:
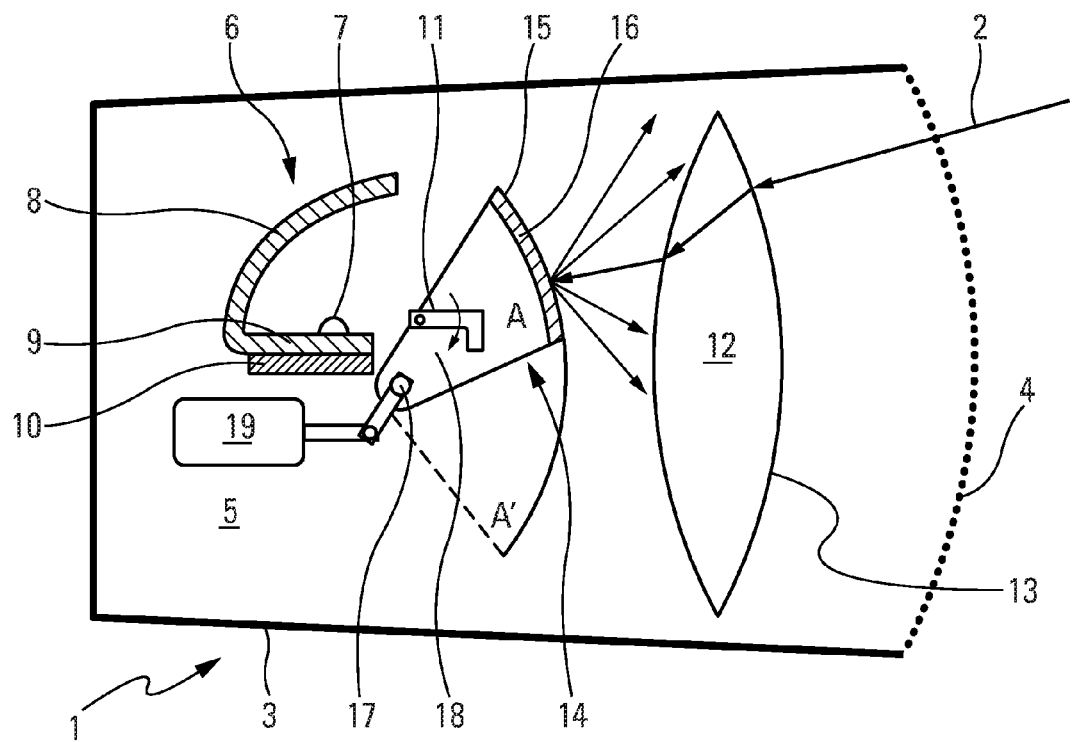
FIG. 1 is a schematic cross-sectional view of the lighting and/or signaling device according to the invention with the main light source turned off.

FIG. 1 illustrates a lighting and/or signaling device 1 intended to be fitted to an automotive vehicle. Such a lighting and/or signaling device 1 is for example a front headlamp of the vehicle, but the invention may also advantageously be applied to a rear lighting unit of a vehicle. In any case, the invention is applicable whenever solar rays, here referenced 2, are liable to be concentrated in a spot inside the lighting and/or signaling device 1.

The lighting and/or signaling device 1 comprises a housing 3 in the shape of a hollow cup, the housing 3 having an open face. The lighting and/or signaling device 1 also comprises a transparent wall 4 installed level with the open face of the housing 3 so as to close an internal volume 5 of the lighting and/or signaling device 1. It will therefore be understood that the internal volume 5 is bounded by the opaque walls of the housing 3 and by the transparent wall 4, the latter for example being a window or wall made of polycarbonate.

An optical module 6 is located in the internal volume, plate or base 9, the optical module 6 consisting of a main light source 7 arranged inside a concave reflector 8 that is, for example, an ellipsoidal reflector that is open toward the front, i.e. in the direction of the transparent wall 4.

The main light source 7 is for example one or more light-emitting diodes, but it may also be a discharge lamp, for example a Xenon discharge lamp. This light source 7 is fitted or securely fastened to a plate 9 from which the reflector 8 extends. The main light source 7 is electrically controlled by a control module 10 which takes the form of a board bearing electronic components intended to control the turn-on or turn-off of the main light source 7.

The optical module 6 furthermore comprises a dipping member 11 that defines a cutoff height for the light rays emitted by the main light source 7. This dipping member 11 takes the form of a (single or double) mask or of a deflector and may, for example, optionally be moved in translation or even in rotation in order to adopt at least two positions, a first of which, for example, corresponds to a projection onto the path traveled by a low beam, and a second position in which the component is retracted to allow the entire beam to pass, especially to provide a high beam. The term "deflector" is especially understood to mean a mask at least one of the faces of which is reflective so as to reflect light rays that, without this mask, would be located above the cutoff in the beam.

The lighting and/or signaling device 1 also comprises an optical focusing device 12, the latter possibly, and advantageously, forming part of the optical module 6.

This optical focusing device 12 is placed longitudinally in front of the main light source 7, i.e. between the latter and the transparent wall 4. This device is thus installed in front of a focal point formed at the reflector 8, and on the path of rays emitted by the main light source 7.

According to one embodiment, the optical focusing device 12 is a convex or biconvex lens. A front face 13 of this lens brings light to a focus.

The lighting and/or signaling device 1, and optionally the optical module 6 that forms a subassembly incorporated into the lighting and/or signaling device, comprises an opaque removable element 14. This element 14 is a screen, also called a stop, capable of adopting at least two positions.

In FIG. 1, the element 14 may adopt two positions a first of which, position A, is drawn with solid lines whereas the second of which, position A', is drawn with dashed lines. The first position A corresponds to a situation where the element 14 is interposed between the main light source 7 and the optical focusing device 12. In other words, the element 14 is installed so as to protect the main light source 7, the dipping member 11, the reflector 8 or the control device 10, from solar rays 2 that otherwise could converge on a focal point and damage the one or more components listed above by heating them. It will be noted that the position of the focal point changes depending on the relative position of the vehicle with respect to the sun.

The second position A' corresponds to a situation in which the element 14 is withdrawn from the path traveled by the light emitted by the main light source 7 when this light is directed toward the optical focusing device 12.

The opaque nature of the element 14 means that solar rays are blocked, deviated, absorbed or reflected by the element 14.

According to a first embodiment, the opaque element 14 absorbs solar rays 2 without reflecting them into the internal volume 5 of the lighting and/or signaling device 1, such an absorption being obtained, for example, by applying paint to the element 14.

Advantageously, the opacity of the element 14 may result from the fact that it bears a coat of paint, the color of which paint is intended to be identical to the color of the body of the vehicle that will receive the lighting and/or signaling device 1.

According to another embodiment, the element 14 comprises a first face 15 turned toward the optical focusing device 12. The opacity of the element 14 results from the fact that this first face 15 reflects solar rays 2 so that they are scattered in the lighting and/or signaling device 1. Such reflection may result from the fact that the first face 15 bears a means forming a mirror, such a means possibly, for example, being formed by an aluminum or chromium layer deposited on the element 14.

Furthermore, the element 14 can move between the first position A and the second position A'. This mobility is obtained by any means allowing the element 14 to adopt these two positions A, A'. According to one embodiment, the element 14 takes the form of a planar and rectilinear shutter that is moved rectilinearly in translation.

According to another embodiment, the element 14 takes the form of a shutter with a curved wall 16 that is connected to a rotation shaft 17 via at least one arm 18. The rotation shaft 17 turns about a rotation axis that, in the example shown in the FIG. 1, extends in a horizontal, or substantially horizontal, direction orthogonally to an optical axis representative of the general direction traveled by the main light beam generated by the main light source 7.

Alternatively, the shaft 17 may extend along a rotation axis that lies perpendicular to the optical axis but that extends in a vertical or substantially vertical direction.

The stability of the element 14 will be increased if each end of the curved wall 16 is held by an arm 18. The rotation shaft 17 interacts with at least one bearing that is securely fastened to the lighting and/or signaling device 1, this bearing being placed in the immediate vicinity of the base 9 holding the main light source 7. According to this embodiment, the opaque element 14 is made to move by rotating this element 14.

As will be seen below, the opaque and movable element 14 is interposed between the main light source 7 and the optical focusing device 12 when the main light source 7 is turned off, i.e. mainly under daytime conditions. The opaque element 14 may also be controlled to such a position when the electrical power supply of the vehicle carrying the lighting and/or signaling device 1 is interrupted.

The first position of the element 14 corresponds to a rest position in the sense that the element 14 remains in this position without the intervention of a power consuming means. By way of example, the first position is maintained by way of a return means that naturally tends to keep the element 14 in the first position. In practice, a spring installed between the housing 3 of the lighting and/or signaling device 1 and the element 14 provides this function ensuring the element 14 remains in the first position A.

The lighting and/or signaling device 1 comprises an actuator 19, for example an electric or pneumatic actuator, the function of which is to make the element 14 pass from the first position A to the second position A', and to keep the element 14 in this second position A' as long as the main light source 7 is turned on.

Figure 2:
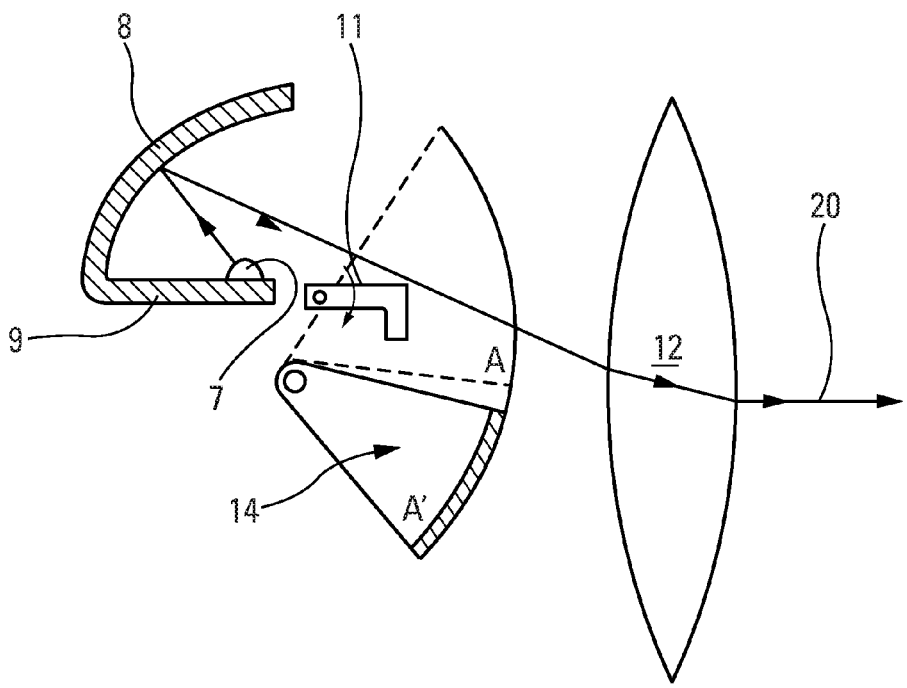

FIG. 2 shows part of the lighting and/or signaling device in FIG. 1. Whereas in the latter figure the ingress of solar rays was stopped in order to prevent heating by a convergence of these rays, FIG. 2 illustrates a situation where the main light source 7 is turned on, either producing a low main light beam 20 in combination with the dipping member 11, or producing a high beam when the dipping member 11 does not obstruct this beam.

In such a situation, the element 14 is retracted from its first position A so as not to interfere with the passage of the light emitted by the main light source 7. The element 14 is withdrawn by a clock-wise rotation so as to move the element 14 below a horizontal plane passing through the base 9. Of course, this is only one embodiment and the invention also includes the case where the element 14 is retracted to the left or right of the main light source 7, or even the case in which the element 14 is retracted above the reflector 8, in a vertical direction.

Figure 3:
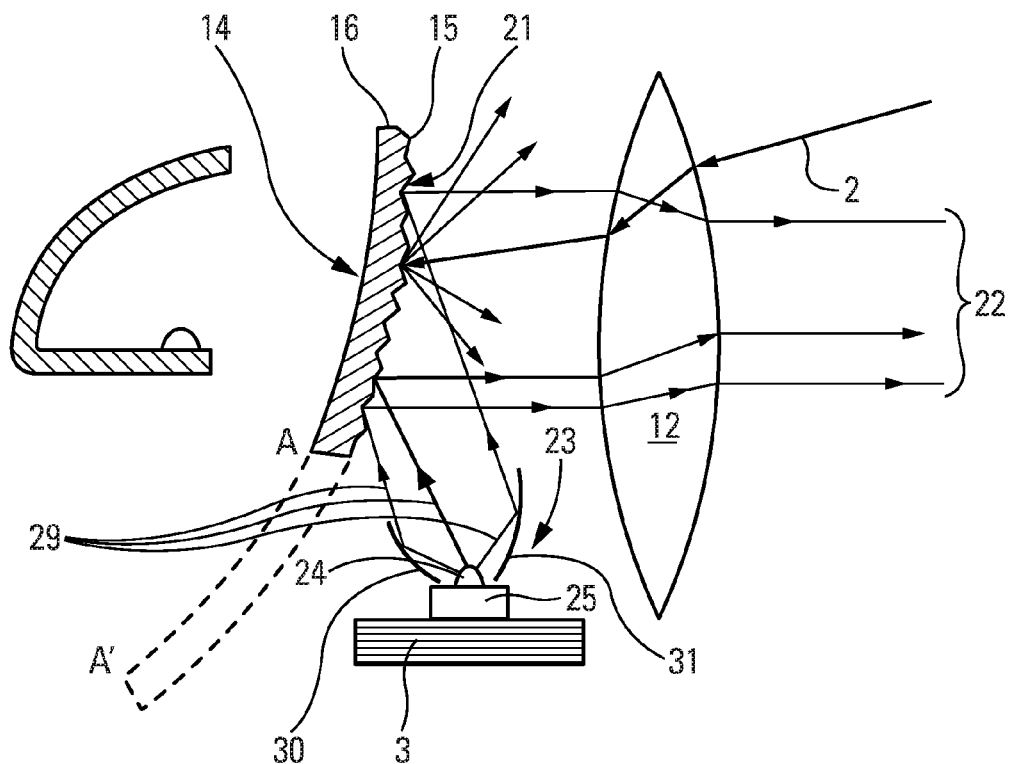
FIG. 3 is a partial cross-sectional view of a first variant of the lighting and/or signaling device according to the invention.
Figure 4:
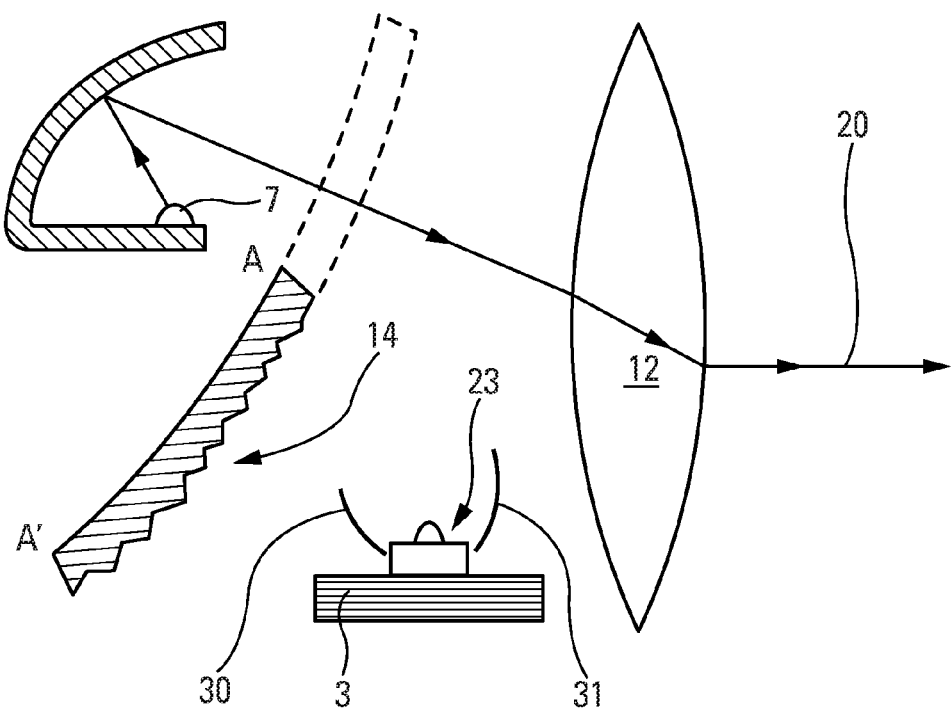

FIGS. 3 and 4 show a first variant of the invention. Elements that are identical to those of the embodiment in FIGS. 1 and 2 are not described again. Instead, only differences with the structure described in FIGS. 1 and 2 will be described below.

The opaque and movable element 14 takes the form of a portion of a cylinder. In other words, the curved wall 16 is not attached to a rotation shaft but instead it is translated in grooves (not shown) produced in the housing 3 of the lighting and/or signaling device 1.

Here, the surface of the first face 15 is uneven. In other words, the first face 15 comprises distortions 21 that act to scatter solar rays 2.

Whether the first face 15 is smooth (FIG. 1) or the presence of distortions 21, such as illustrated in FIGS. 3 and 4, make it uneven, the first face 15 is arranged to reflect an additional light beam 22. Such a beam is additional in the sense that it is distinct from the light generated by the main light source 7.

According to one embodiment, the additional light beam 22 is generated by an additional light source 23 placed, in the internal volume of the lighting and/or signaling device 1, so as to be separate and distinct from the main light source 7. According to this variant, the additional light source 23 is formed by one or more light-emitting diodes 24 installed on a holder 25 that is securely fastened to the housing 3 of the lighting and/or signaling device 1. It will therefore be understood that the additional light source 23 is separate from the element 14, the latter being able to move between its first position A and its second position A' without there being a need for the additional light source 23 to move.

In order for the additional light beam 22 to be projected out of the lighting and/or signaling device 1, the light source 23 is fitted between the element 14 and the optical focusing device 12.

In the example described, the lighting and/or signaling device 1 comprises two parabolic reflectors 30 and 31 arranged to collimate light rays 29 emitted by the one or more diodes 24 toward the first face 15, so as to optimize the luminous flux of the additional light beam 22. The invention is not limited to this type of collimator and it could be envisioned to use a convergent lens or a spherical mirror. What is important here is to provide a means able to make the rays emitted by the additional light source 23 converge.

After collimation, the light rays 29 are reflected by the first face 15, especially by its distortions, toward the optical focusing device 12 in order to provide an additional illumination function.

Thus, the protective element 14 is used to provide an additional function. In the present case, this function is a daytime running lamp but it may also be a direction indicator or even a positioning light (also called a side marker light).

FIG. 4 shows the structure of the first variant but in a situation where the main light source 7 is turned on, which involves turning the additional light source 23 off and moving the element 14 so as to cause it to pass from its first position A to its second position A', in order to clear the path of the beam 20.

Figure 5:
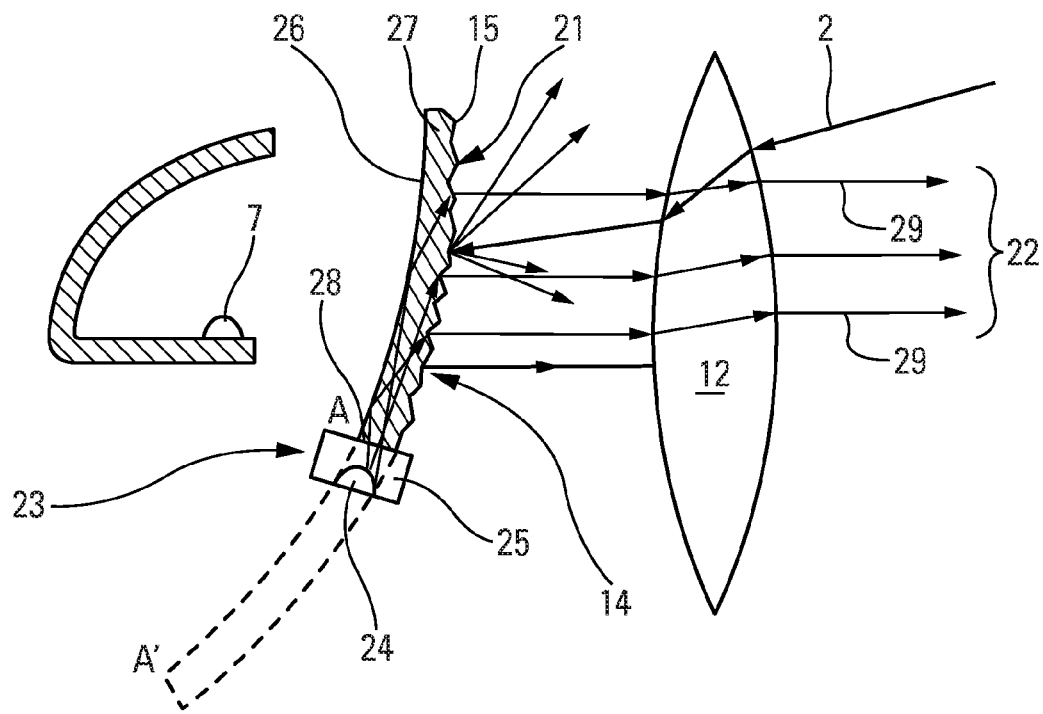
FIG. 5 is a partial cross-sectional view of a second variant of the lighting and/or signaling device according to the invention.
Figure 6:
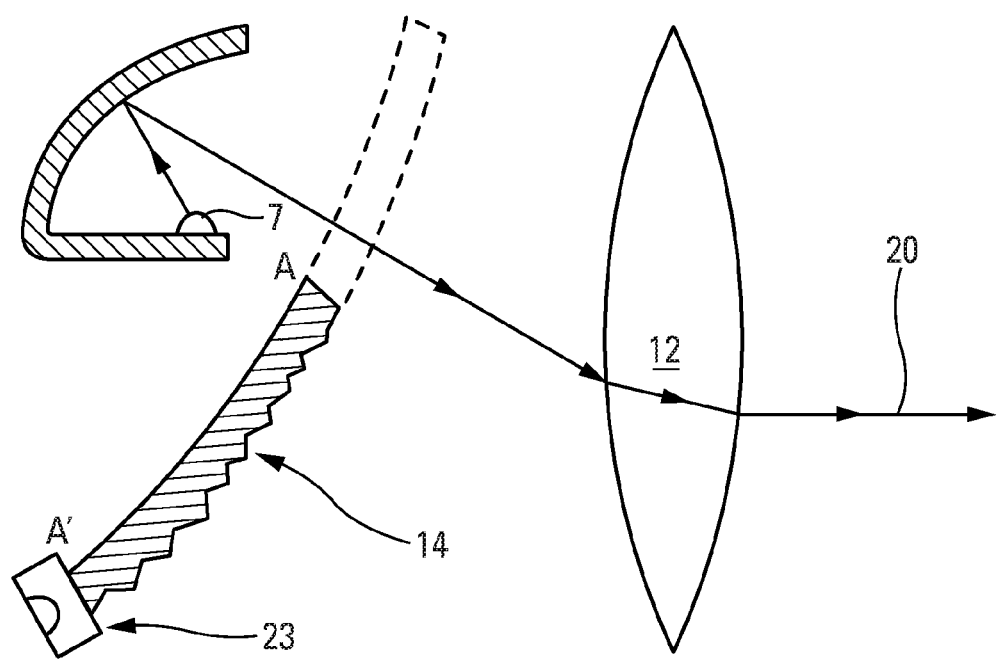

FIGS. 5 and 6 show a second variant of the invention. Elements that are identical to those of the embodiment in FIGS. 3 and 4 are not described again. Instead, only differences with the structure described in FIGS. 3 and 4 will be described below.

According to this second variant, the element 14 is made opaque by treating a second face 26, this second face 26 lying opposite the first face 15 relative to a body 27 that forms the element 14. In other words, this second face 26 is the face, of the element 14, that is turned toward the main light source 7. This second face 26 may be treated, for example, by applying a reflective, for example aluminum, coating to the second face 26, this layer stopping solar rays 2 from propagating through the element 14.

The body 27 is translucent and advantageously transparent. It is for example made of a plastic capable of transmitting or guiding a light beam. The body 27 is thus arranged as a light guide dedicated to the additional light source 23.

According to this second variant, the additional light source 23 is securely fastened to the element 14 in that it moves at the same time as this element 14. The holder 25 is thus securely fastened to an edge face or end 28 of the element 14, and the one or more light-emitting diodes are installed so that the additional light rays 29 emitted by the additional light source 23 penetrate into the thickness of the element 14, i.e. into the body 27 between the first face 15 and the second face 26.

The additional light rays 29 are guided in the translucent body 27 toward the first face 15.

The term "guided" is understood to mean that the rays 29 reach the first face 15 either directly or after reflection from the second face 26.

The additional light rays 29 exit from the element 14 via a plurality of distortions 21, provided on the first face 15, so as to form the additional light beam 22.

Alternatively, it is possible for the first face 15 to be smooth and for deviating features, for example prisms, to be provided on the second face 26 in order to provide enough local interference with the guided light to cause the rays to exit from the opaque element 14.

The additional light source 23 has been shown on the lower edge face 28 of the element 14 but needless to say the invention includes the case where this additional light source 23 is installed on an upper edge face of the opaque and movable element 14. Generally, and for this second variant, it will be understood that the additional light source 23 is securely fastened to the opaque element 14.

FIG. 6 shows the structure of the second variant of the invention in a situation where the main light source 7 is turned on, thus generating its main light beam 20, which beam is focused by the optical focusing device 12. This involves turning off the additional light source 23 while it is fastened to the end of the element 14. This turn-off is accompanied by a movement of the element 14 so as to cause it to pass from its first position A to its second position A', in order to clear the path of the beam 20.

According to the invention, the additional light source 23 may take a third form. This additional light source 23 and the opaque element 14 form only one and the same part, the latter providing the function protecting from solar rays and the additional illumination function.

According to one embodiment of the invention, the opaque element 14 thus comprises the additional light source, the latter taking the form of an area light source the light-emitting surface of which is turned toward the optical focusing device 12.

Advantageously, the emission area of the area light source is larger than 1 cm$^2$, even larger than 5 cm$^2$, and even larger than 10 cm$^2$.

Preferably, relative to light-emitting diodes with a Lambertian emission profile, the area light source has a highly directional emission that is directed perpendicular to the emitting surface of the source.

According to one variant, the area light source has a luminance of at least 5000 Cd/m$^2$.

It will be noted by way of example that this area light source may be an organic light-emitting diode.

The above description provides all the elements necessary to implement a method for operating a lighting and/or signaling device according to any one of the variants illustrated in FIGS. 1 to 6. According to the method, the lighting and/or signaling device 1 comprises the main light source 7 and an optical focusing device 12 able to receive the light generated by the main light source 7 with a view to forming a main light beam 20. The lighting and/or signaling device 1 furthermore comprises an opaque element 14 that can move between at least two positions A and A', one of the positions interposing the opaque element 14 between the main light source 7 and the optical focusing device 12 so as to prevent rays 2 originating from outside the lighting and/or signaling device 1 from converging.

According to this method, the opaque element 14 is interposed between the main light source 7 and the optical focusing device 12 when the main light source 7 is turned off. To do this, a return means keeps the element 14 in its first position A and the actuator 19 is not turned on.

The method also makes provision for another alternative or complementary step, in which the opaque element 14 is placed between the main light source 7 and the optical focusing device 12 as soon as the electrical power supply of the vehicle is turned off, such a supply supplying the on-board network of the vehicle. This supply is turned off when the terminal that is positive after ignition is disconnected.

According to an additional step of the method, provision is made for the lighting and/or signaling device 1 to comprise the additional light source 23, the latter being turned on or activated when the opaque element 14 is interposed between the main light source 7 and the optical focusing device 12, i.e. when it is in its first position A.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A lighting and/or signaling device comprising at least one main light source and an optical focusing device able to receive light generated by said at least one main light source with a view to forming a main light beam, said lighting and/or signaling device comprising an opaque element that can move between at least two positions (A, A'), one of the positions interposing said opaque element between said at least one main light source and said optical focusing device, in which said opaque element is arranged so that when it is interposed between said at least one main light source and said optical focusing device it prevents rays originating from outside said lighting and/or signaling device from being focused, especially in a line or spot, by said optical focusing device, in order to prevent degradation of said lighting and/or signaling device;
said lighting and/or signaling device further comprising an additional light source for emitting an additional light beam toward said focusing device; wherein said additional light beam is emitted towards or through said opaque element.

2. The lighting and/or signaling device according to claim 1, comprising an optical module able to generate a light beam forming at least part of a main light beam when said opaque element is in a closed position, said optical module comprising said at least one main light source and said optical focusing device, said opaque element being arranged so that when it is interposed between said at least one main light source and said optical focusing device it prevents rays originating from outside said lighting and/or signaling device from being focused by said optical focusing device on at least one of the components of said optical module, in order to prevent degradation of said component of said optical module.

3. The lighting and/or signaling device according to claim 2, wherein said optical module comprises at least one member for dipping a main beam.

4. The lighting and/or signaling device according to claim 2, wherein said at least one component of said optical module is said at least one main light source and/or a member for dipping said main beam.

5. The lighting and/or signaling device according to claim 1, in which said opaque element comprises a first face turned toward said optical focusing device, said first face being reflective.

6. The lighting and/or signaling device according to claim 1, comprising said additional light source separate from said opaque element and generating said additional light beam.

7. A lighting and/or signaling device comprising at least one main light source and an optical focusing device able to receive light generated by said at least one main light source with a view to forming a main light beam, said lighting and/or signaling device comprising an opaque element that can move between at least two positions (A, A'), one of the positions interposing said opaque element between said at least one main light source and said optical focusing device, in which said opaque element is arranged so that when it is interposed between said at least one main light source and said optical focusing device it prevents rays originating from outside said lighting and/or signaling device from being focused, especially in a line or spot, by said optical focusing device, in order to prevent degradation of said lighting and/or signaling device;
wherein said opaque element comprises a transparent or translucent body, said transparent or translucent body comprising a first face turned toward said optical focusing device, said first face being transparent or translucent, and a second face turned toward said main light source, said second face being opaque, said transparent or translucent body being arranged so as to transmit an additional light beam.

8. The lighting and/or signaling device according to claim 7, in which said opaque element comprises an additional light source capable of generating said additional light beam and arranged so that said additional light beam propagates in said transparent or translucent body.

9. The lighting and/or signaling device according to claim 1, in which said opaque element comprises said additional light source capable of generating said additional light beam, said additional light source being an area light source, a light-emitting area of which is turned toward said optical focusing device.

10. The lighting and/or signaling device according to claim 9, in which said area light source is an organic light-emitting diode.

11. The lighting and/or signaling device according to claim 1, in which said opaque element is movable in rotation.

12. The lighting and/or signaling device according to claim 1, in which said opaque element is a shutter able to adopt a first position (A) interposing said opaque element between said main light source and said optical focusing device under the action of a return means, and a second position (A') where it permits the passage of light originating from said at least one main light source, especially through said optical focusing device, via activation of an actuator.

13. The lighting and/or signaling device according to claim 1, in which said main light source is at least one light-emitting diode.

14. The lighting and/or signaling device according to claim 1, in which said optical focusing device is a lens.

15. A method for operating a lighting and/or signaling device for an automotive vehicle comprising at least one main light source and an optical focusing device able to receive light generated by said at least one main light source with a view to forming a main light beam, said lighting and/or signaling device comprising an opaque and movable element, in which said opaque and movable element is interposed between said at least one main light source and said optical focusing device so as to prevent rays originating from outside said lighting and/or signaling device from being focused, especially in a line or spot, by said optical focusing device, in order to prevent degradation of said lighting and/or signaling device;
said lighting and/or signaling device further comprising an additional light source for emitting an additional light beam toward said focusing device; wherein said additional light beam is emitted towards or through said opaque element.

16. The method according to claim 15, in which said opaque element is interposed between said at least one main light source and said optical focusing device when said at least one main light source is turned off.

17. The method according to claim 15, in which said opaque element is interposed between said at least one main light source and said optical focusing device when an electrical power supply of a vehicle is interrupted.

18. The method according to one claim 15 implementing a lighting and/or signaling device comprising said at least one main light source and said optical focusing device able to receive light generated by said at least one main light source with a view to forming said main light beam, said lighting and/or signaling device comprising said opaque element that can move between at least two positions (A, A'), one of the positions interposing said opaque element between said at least one main light source and said optical focusing device, in which said opaque element is arranged so that when it is interposed between said at least one main light source and said optical focusing device it prevents rays originating from outside said lighting and/or signaling device from being focused, especially in a line or spot, by said optical focusing device, in order to prevent degradation of said lighting and/or signaling device.

19. The lighting and/or signaling device according to claim 3, wherein said at least one component of said optical module is said at least one main light source and/or a member for dipping said main beam.

20. The lighting and/or signaling device according to claim 2, comprising means for emitting an additional light beam toward said optical focusing device, these means comprising said opaque element.

21. The lighting and/or signaling device according to claim 3, in which said opaque element comprises a first face turned toward said optical focusing device, said first face being reflective.

22. The lighting and/or signaling device according to claim 5, comprising said additional light source separate from said opaque element and generating said additional light beam.

23. A lighting and/or signaling device comprising at least one main light source and an optical focusing device able to receive light generated by said at least one main light source with a view to forming a main light beam, said lighting and/or signaling device comprising an opaque element that can move between at least two positions (A, A'), one of the positions interposing said opaque element between said at least one main light source and said optical focusing device, in which said opaque element is arranged so that when it is interposed between said at least one main light source and said optical focusing device it prevents rays originating from outside said lighting and/or signaling device being focused, especially in a line or spot, by said optical focusing device, in order to prevent degradation of said lighting and/or signaling device; and
an optical module able to generate a light beam, especially a light beam forming at least part of a main light beam, said optical module comprising components which include said at least one main light source and said optical focusing device, said lighting and/or signaling device further comprising said opaque element arranged so that when it is interposed between said at least one main light source and said optical focusing device it prevents rays originating from outside said lighting and/or signaling device from being focused by said optical focusing device on at least one of the components of said optical module in order to prevent degradation of said component of said optical module;
wherein said opaque element comprises a transparent or translucent body, said transparent or translucent body comprising a first face turned toward said optical focusing device, said first face being transparent or translucent, and a second face turned toward said main light source, said second face being opaque, said transparent or translucent body being arranged so as to transmit an additional light beam.

24. The lighting and/or signaling device according to claim 2, in which said opaque element is movable in rotation.

* * * * *

UNITED STATES PATENT AND TRADEMARK OFFICE
CERTIFICATE OF CORRECTION

PATENT NO. : 9,033,560 B2  
APPLICATION NO. : 13/683327  
DATED : May 19, 2015  
INVENTOR(S) : Puente et al.

It is certified that error appears in the above-identified patent and that said Letters Patent is hereby corrected as shown below:

In the Claims

Claim 23, Column 14, line 28, insert --from-- before "being focused."

Signed and Sealed this
Sixth Day of October, 2015

Michelle K. Lee
*Director of the United States Patent and Trademark Office*